(12) United States Patent
Apelqvist

(10) Patent No.: US 8,201,263 B2
(45) Date of Patent: Jun. 12, 2012

(54) METHOD AND APPARATUS FOR ENABLING ACCESS TO CONTACT INFORMATION

(75) Inventor: Johan Anders Apelqvist, Hjarup (SE)

(73) Assignee: Sony Ericsson Mobile Communications AB, Lund (SE)

( * ) Notice: Subject to any disclaimer, the term of this patent is extended or adjusted under 35 U.S.C. 154(b) by 551 days.

(21) Appl. No.: 12/104,531

(22) Filed: Apr. 17, 2008

(65) Prior Publication Data
US 2009/0265794 A1    Oct. 22, 2009

(51) Int. Cl.
*G06F 7/04* (2006.01)
(52) U.S. Cl. .............. 726/30; 726/2; 726/7; 379/201.11
(58) Field of Classification Search .................... 726/30, 726/2, 7; 379/201.11
See application file for complete search history.

(56) References Cited

U.S. PATENT DOCUMENTS

| | | |
|---|---|---|
| 6,691,158 B1 | 2/2004 | Douvikas et al. |
| 7,017,109 B1 | 3/2006 | Douvikas et al. |
| 7,839,987 B1 * | 11/2010 | Kirchhoff et al. ........ 379/142.02 |
| 2003/0163705 A1 | 8/2003 | Richards, Jr. et al. |
| 2004/0190703 A1 * | 9/2004 | Trandal et al. ........... 379/210.01 |
| 2006/0075231 A1 | 4/2006 | Yu et al. |
| 2007/0081649 A1 * | 4/2007 | Baudino et al. .......... 379/201.11 |

FOREIGN PATENT DOCUMENTS

| | | |
|---|---|---|
| DE | 103 36 323 | 3/2005 |
| FR | 2 872 320 | 12/2005 |
| JP | 2002-259406 | 9/2002 |
| JP | 2005-517222 | 6/2005 |
| JP | 2006-099716 | 4/2006 |
| JP | 2006-101469 | 4/2006 |
| WO | WO 03/021387 | 3/2003 |

OTHER PUBLICATIONS

Dawson et al., "vCard MIME Directory Profile", Network Working Group, RFC 2426, The Internet Society, 1998, 40 pages.
Notification of Transmittal of the International Search Report and the Written Opinion of the International Searching Authority, or the Declaration corresponding to PCT/EP2008/008145, mailed Jan. 15, 2009, 15 pages.

* cited by examiner

*Primary Examiner* — Ellen Tran
(74) *Attorney, Agent, or Firm* — Harrity & Harrity, LLP

(57) ABSTRACT

A method, an apparatus and a processor readable medium for enabling access to contact information. The contact information for contacting a recipient may be accessed in accordance with a rights object.

36 Claims, 7 Drawing Sheets

FIG. 7A
| vCard | |
|---|---|
| NAME: | BRENT JOHNSON | —701
| CELL PHONE: | 562 123 4567 | —702
| HOME PHONE: | 562 987 6543 | —703
| VoIP ID: | JOHNSON123 | —704
FIG. 7B
| RIGHTS OBJECT | OWNER BRENT JOHNSON | |
|---|---|---|
| PERMISSIONS | | |
| CONTACT: | YES | —711 |
| DISPLAY: | NAME | —712 |
| FORWARD: | NO | —713 |
| CONSTRAINTS | | |
| TYPE OF CONTACT: | SMS | —716 |
| NUMBER OF CONTACTS: | 2 | —717 |
| NUMBER OF FORWARDING: | N/A | —718 |
710
715

METHOD AND APPARATUS FOR ENABLING ACCESS TO CONTACT INFORMATION

FIELD OF THE INVENTION

The present invention relates generally to a method for enabling access to contact information. In particular, the invention relates to a method, an apparatus and a computer-readable medium for enabling the use of contact information for contacting a recipient.

BACKGROUND OF THE INVENTION

The use of modern communication devices has become more and more pervasive in society. In particular, mobile phones have become wide-spread, with almost every person having access to a mobile phone in some regions. Other no commonly available forms of communication include Voice-over-IP telephony, short message services (SMS) or e-mail communication, which is also available on mobile devices. A common aspect of these types of communication is that the subscriber can be reached by a unique identification feature, which may have the form of a telephone number or a cellular phone number or e-mail address, an IP address or other user identification codes. In order to be reachable by another person, it is generally necessary to exchange contact details which may comprise such an identification feature. The contact information can be exchanged manually, for example by a person writing down a telephone number, or electronically, for example by sending a SMS to a mobile phone comprising contact details. Mobile phones generally comprise a feature that discloses the phone number of a person calling and may be stored for further communication.

More modern devices are capable of exchanging contact information by means of an electronic business card (vCard). The vCard can comprise information such as a name of a person, an address and a telephone number. The vCard may be entered into the phone book of the mobile phone receiving the vCard. The user of the receiving phone may then use the vCard to contact its owner. The vCard can for example be transmitted by using a wireless transmission protocol such as Bluetooth.

With the above methods of exchanging contact information, the person receiving the contact information can store the contact information on the receiving device. The user is thus given the option to always contact the person or device designated in the contact information. Furthermore, there is no restriction on the user sharing the contact information with other users. Providing the user receiving the contact information with such possibilities is not always desired. A person may not wish that his contact details are shared with other persons. Further, it is desirable that the person receiving the contact information is not allowed to always be able to contact the sender. Accordingly, there is the need to control access to such contact information, so that the use of the contact information is restricted.

SUMMARY OF THE INVENTION

The present invention provides a method, an apparatus, and a computer-readable medium for enabling access to contact information.

According to a first aspect of the invention, a method of enabling access to contact information comprises a step of providing a rights object associated with contact information for contacting a recipient. The rights object is transmitted to a receiving device. The rights object is such that by receiving said rights object, the receiving device, having access to said contact information, is enabled to contact the recipient. The contact information may for example be encrypted and the rights object may comprise information for decrypting the contact information. By using the method, controlled access to the contact information can be enabled.

According to an embodiment of the invention, the rights object comprises information about which part of said contact information is to be disclosed to the user of the receiving device. The contact information may for example comprise different types of contact details. The rights object may then comprise usage permissions and/or constraints individually assigned to the contact details. Contact details may comprise a name, a telephone number, a cellular phone number, an e-mail address, an internet protocol address, a Voice-over-IP user identification, other kinds of internet-based used identification, company information or address information, or a combination thereof. Just as an example, the rights object may comprise a permission for disclosing the name, yet it may not comprise permission for disclosing the cellular phone number. A controlled access to the contact information is thus enabled.

According to another embodiment, the method further comprises a step of transmitting the contact information to the receiving device. The contact information may for example have the form of a vCard. The rights object and the contact information may be transmitted in a single file or in separate files or in any other way.

According to another embodiment, the method further comprises a step of selecting a permission and/or constraint for using the contact information. The rights object may for example comprise at least one usage permission for using the contact information. The usage permission may be selected from a group comprising a permission to contact, a permission to display, a permission to forward, a permission to copy, and a permission to print. As another example, the rights object may comprise at least one constraint for using the contact information. Such a constraint may be a permitted number of contacting, a person authorized to use, a number of permitted forwarding of the contact information, a permitted type of contact, or a permitted time of contact. Such permissions or constraints may be predetermined or may be selected by a user. It is thus possible to precisely determine how the contact information is used by the receiving device.

According to another embodiment, the method further comprises a step of generating the rights object in accordance with the selected permission and/or constraint. The generated rights object can then be transmitted to the receiving device. The contact information may comprise information for contacting the device transmitting the rights object. Yet it may also comprise information for contacting another device.

According to another aspect of the invention, a method of enabling access to contact information comprises a step of receiving a rights object associated with contact information for contacting a recipient. The contact information is then accessed and the use of the contact information is enabled for contacting the recipient. The use of the contact information is enabled in accordance with information comprised in the rights object. With this method, it is possible to control the use of the contact information, which is beneficial for the owner of the contact information.

According to an embodiment, the method further comprises a step of receiving said contact information. The contact information and the rights object may for example be received in one file. Yet the contact information and the rights object may also be received separately from different sources. The method may further comprise a step of contacting the recipient. The recipient may be the device which is providing the rights object, yet it may also be another device for which contact details are comprised in the contact information.

According to another embodiment, the rights object comprises at least one permission and/or restriction for displaying contact details comprised in said contact information. In accordance with the at least one permission and/or restriction comprised in the rights object, the contact information may then be displayed. As in the above example, the contact information may comprise one or more contact details, the disclosure of some of which may be permitted or restricted. Accordingly, it can be controlled which part of the contact information is disclosed to a user of the device receiving the rights object. In another embodiment, the method further comprises a step of disabling the use of the contact information to contact the recipient. The disabling may be performed in response to a constraint provided in the rights object being exceeded. Thus, enhanced control of the access to the contact information is provided.

The features of the above embodiments and aspects of the invention may be combined.

According to another aspect of the invention, a device capable of enabling access to contact information is provided. A storage unit assigned to the device stores a rights object associated with contact information for contacting a recipient. The storage unit may be comprised in the device. A sending unit of the device transmits the rights object to a receiving device. A rights management unit is further provided, which manages the rights objects. The rights object comprises information enabling the receiving device, which has access to the contact information, to contact the recipient. With such a device, the use of contact information to which another device has access, can be controlled.

According to an embodiment of the invention, the rights management unit is implemented as a digital rights management (DRM) agent running on the device. Managing the rights object may comprise creating, deleting or configuring the rights object, or removing, inserting, setting, assigning or adjusting contents of the rights object, such as permissions, restrictions, constraints, and other types of operations performable by a DRM agent. The rights management unit may comprise means for creating and/or modifying the rights objects. The device may for example comprise an input unit for entering a permission and/or a constraint. These may then be included in the rights object. As another example, the rights object may comprise at least one restriction for displaying a contact detail comprised in said contact information at the receiving device. The device is by means of the rights object capable of controlling the disclosure of the contact information at the receiving device.

According to another embodiment, the device may furthermore be configured to transmit the contact information to the receiving device. The contact information may comprise details for contacting the device. E.g., the device may be implemented as a cellular phone, a personal data assistant, a wireless hand-held device, a portable computer, a network-connected computer, an internet server, a telephone or a set top box.

According to another aspect of the invention, a device capable of enabling access to contact information is provided, which comprises a receiving unit and a sending unit. The receiving unit receives a rights object associated with contact information for contacting a recipient. The device further comprises a rights management unit which enables the sending unit to contact the recipient in accordance with information comprised in said rights object. With such a device, it is possible to control how the contact information is used.

According to an embodiment, the rights management unit is configured so as to restrict the disclosure of said contact information to a user of the device in accordance with information comprised in said rights object. The rights object may for example comprise a permission or restriction for displaying a contact detail of the contact information. According to another embodiment, the rights object comprises constraints for the use of the contact information. The rights management unit is configured to enforce the observation of said constraints. For example, the rights management unit may be configured to disable the use of the contact information for contacting the recipient in response to a constraint being met or exceeded. Such a constraint may relate to a maximum number of times the device is permitted to contact the recipient.

According to another embodiment, the receiving unit of the device is further designed such that it receives said contact information. It may for example be received from the same source as the rights object or from another source. E.g., the device may be implemented as a cellular phone, a personal data assistant, a wireless hand-held device, a portable computer, a network-connected computer, an internet server, a telephone or a set top box.

The features of the above described devices and the embodiments may be combined in one device.

In accordance with another embodiment of the invention, a computer-readable medium having computer-executable instructions for enabling access to contact information is provided. The computer-executable instructions, when executed by a processor unit of a corresponding device, may perform any of the above-described methods.

The foregoing and other features and advantages of the invention will become further apparent from the following detailed description of illustrative embodiments when read in conjunction with the drawings.

BRIEF DESCRIPTION OF THE DRAWINGS

Embodiments of the present invention are illustrated by the accompanying figures, wherein:

FIGS. 7A and 7B are schematic diagrams of a vCard and a rights object, respectively, according to an embodiment of the invention.

DETAILED DESCRIPTION OF THE INVENTION

Figure 1:
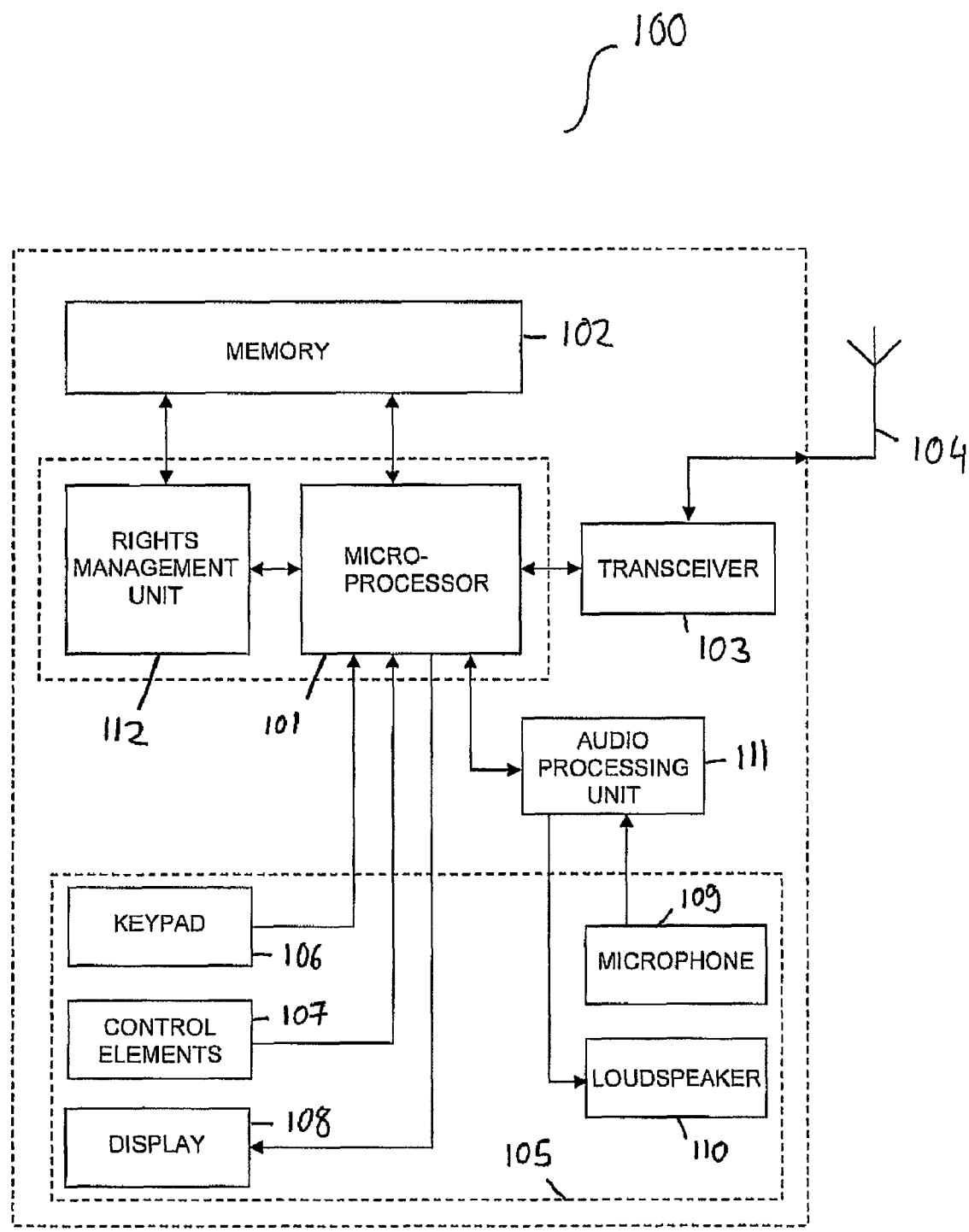
FIG. 1 is a schematic diagram of a device capable of controlling access to contact information according to an embodiment of the invention.

FIG. 1 shows a schematic diagram of a device according to an embodiment of the invention. The device of FIG. 1 is capable of controlling access to contact information, both internally and by supplying a rights object to another device. The general operation of the exemplary device 100 will now be described.

The device 100 comprises a micro processor 101, which interfaces several components of the mobile device 100, e.g. by an input/output unit (not shown). Exchange of control signals or data between the components may be achieved by a bus system. The micro processor 101 can control the operation of the device 100, according to programs stored in memory 102. Micro processor 101 may be implemented as a single micro processor or as multiple micro processors, in the form of a general purpose or special purpose micro processor, or digital signal processors. Memory 102 may comprise all forms of memory, such as random access memory (RAM), read only memory (ROM), non volatile memory such as EPROM or EEROM, flash memory or hard drive. Some of these types of memory may be removable from the device 100, e.g. flash memory cards, while others may be integrated for example with micro processor 101.

Transceiver 103 is functionally connected to antenna 104 for receiving and sending out electromagnetic signals. Transceiver 103 is a fully functional cellular radio transceiver and can be used to establish a cellular phone connection to a subscriber or to transmit short messages or data through a mobile telephony or wireless network. The transceiver may operate according to any known standard, comprising standards known as the global system for mobile communications (GSM), TIA/EIA-136, cdmaOne, cdma2000, UMTS, and wideband CDMA. Transceiver 103 may also operate according to other standards, for example for exchanging data, such as a GPRS standard, wireless local area network standards (e.g. IEEE802.11G), a wireless personal area network standard (IEEE802.15), or any bluetooth standard, such as Bluetooth 2.1. Transceiver 103 may thus comprise different circuits for mobile communication and for data exchange, and may interface more than one antenna.

The device 100 further comprises a user interface 105. The user interface 105 comprises a keypad 106, control elements 107, a display 108, a microphone 109 and a loudspeaker 110. Display 108 is used to display information, function menus and the like to a user of the device 100. Display information may comprise a picture or image, service information, contact information, internet-related information and other information that is to be presented to a user of device 100. Keypad 106 may be used to enter text or digits, and comprises alphanumeric keys, menu keys and the like. Control elements 107 can comprise additional elements for controlling device 100, such as a turn-push-button, joystick-like control elements, a mouse or a trackball, a rotary switch, rocker and the like. Depending on the implementation of the device 100, the user may use the keypad and the control elements to bring up a menu on display 108, to select and execute functions, to enter and dial a telephone number, or to compose an e-mail or short message and initiate its transmission.

Microphone 109 and loudspeaker 110 interface audio processing unit 111. Microphone 109 may record a voice signal of a user, and audio processing unit 111 may convert such a signal to a digital signal and provide it to micro processor 101, e.g. through an input/output unit. Similarly, a sound signal that is to be output to the user such as the voice signal received during a telephone conversation, is provided directly or via micro processor 101 to audio processing unit 111. Audio processing unit 111 may convert such a signal to an analogue signal which is then output by speaker 110. Microphone 109 and loudspeaker 110 may for example be used to communicate with another person by mobile telephony or Voice-over-IP telephony. Other functions may include the playback of a soundfile stored in memory 102, or the activation of a function via voice control.

Device 100 further comprises a rights management unit 112. Rights management unit 112 may for example be implemented as a digital rights management (DRM) agent running on micro processor 101. One of the functions of rights management unit 112 is the management of rights objects. The function may comprise the creation, configuration and removal of rights objects and the management of content associated with the rights objects. Rights management unit 112 is further configured to enforce permissions and/or constraints comprised in such a rights object. Rights management unit 112 interfaces memory 102 for storing or accessing rights objects and content. Rights management unit 112 further interfaces receiver 103 via micro processor 101 for receiving or transmitting rights objects or content.

Device 100 may for example be implemented as a cellular phone. Transceiver 103 may then be used to establish a telephone connection to another cellular phone or to a fixed line phone, or to transmit or receive data e.g. via GPRS, Bluetooth, W-LAN or the like. Yet device 100 may also be implemented as a portable or desktop computer, which may transmit data by means of transceiver 103 of a wireless network (W-LAN). Additionally or alternatively, such a computer may also comprise a network card through which it may establish a fixed line connection to a network for exchanging data. Such data may also comprise voice data and the connection may thus be used for Voice-over-IP telephony or similar forms of communicating. Device 100 may also comprise an infrared port for establishing a connection to another device. Further implementations of device 100 comprise a personal data assistant, a wireless hand held device such as a Blackberry M, an internet server, a fixed-line telephone which may work conventionally or over the internet, or a set top box.

It should be clear that FIG. 1 is only an illustrative example and that some of the components shown are not necessary in other embodiments of the invention. If implemented as an internet server, the device does for example not need to comprise an audio processing unit, a microphone and a loudspeaker, nor does it need to be provided with a keypad, control elements and a display. The antenna 104 may then for example be substituted with a connector for connecting to a computer network.

Figure 2:
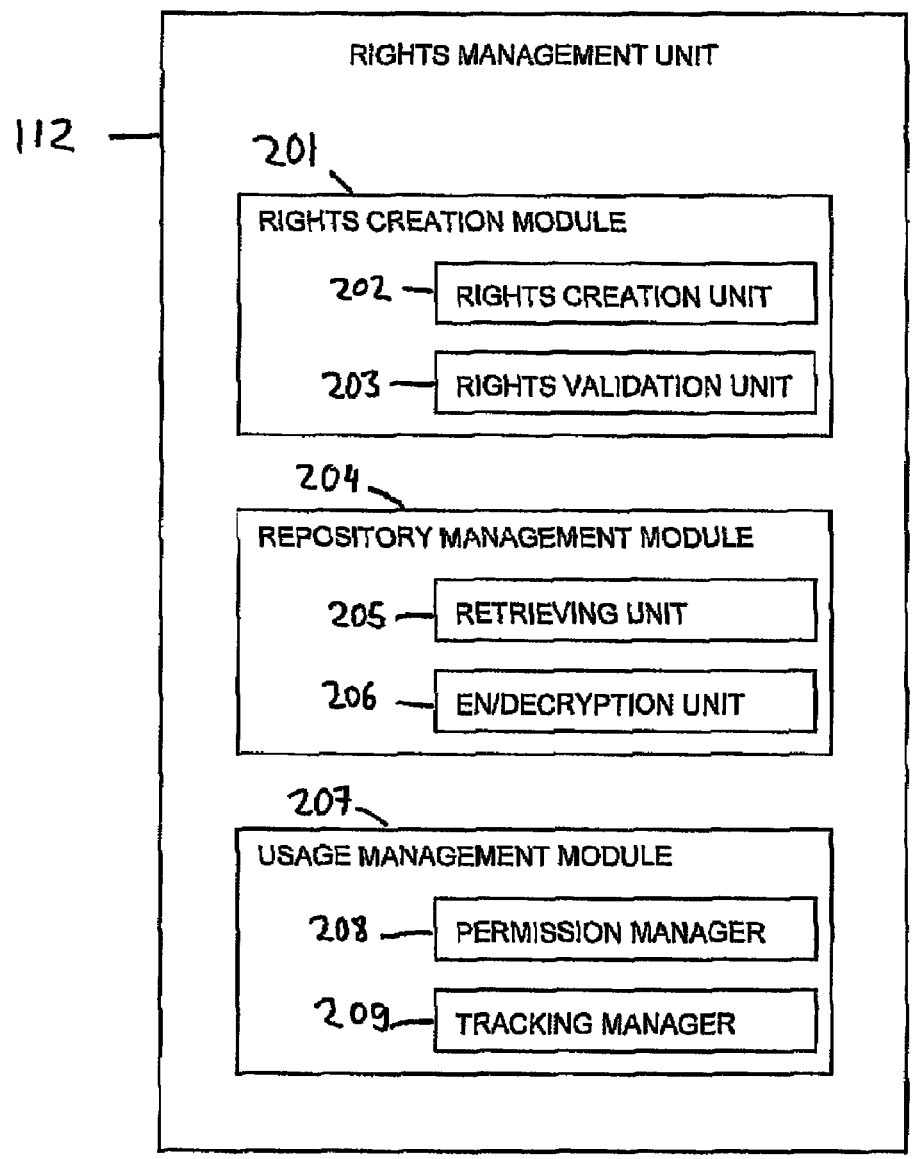
FIG. 2 is a schematic diagram of functional modules comprised in a rights management unit according to an embodiment of the invention.

FIG. 2 shows a schematic block diagram of the rights management unit 112. In particular, FIG. 2 shows functional modules which may be comprised in the rights management unit according to an embodiment of the invention. In this embodiment, the rights management unit is designed so as to generate the rights object for contact information and to manage contact information in accordance with a rights object. In the present embodiment, device 100 is implemented as a mobile phone and has contact information in form of a vCard stored in memory 102.

The vCard comprises contact information of the user or owner of the device, and an example of such a vCard is shown in FIG. 7A. FIG. 7A is only a schematic representation of information comprised in the vCard. Here, the vCard comprises information 701 about the name of the user, information 702 about the cellular phone number, information 703 about the home phone number, and a Voice-over-IP (VoIP) identification 704.

The rights management unit 112 manages a rights object associated with the vCard of the owner or user of the device. The rights management unit prepares the contact information in form of the vCard and the rights object such that it can be transmitted to another device, where the contact information can only be used in accordance with permissions and constraints comprised in the rights object. A further function of the rights management unit 112 is to ensure that when receiving a rights object and a contact information, the contact information is only used as permitted by rights comprised in the rights object. The rights management unit may also perform other functions relating to digital rights management, such as managing rights associated with files, e.g. music or video files, and may as such comprise the full functionality of a digital rights management agent.

In the present embodiment, rights management unit 112 comprises a rights creation module 201. Rights creation unit 202 comprised in the rights creation module can create a new rights object or modify an existing rights object. It allows rights to be assigned to contact information, and may specify the rights owner, allowable usage permissions and constraints. Rights creation module 201 further includes rights validation unit 203, which is used to ensure the consistency of rights when new content is created, such as when creating a new vCard from an existing vCard associated with the rights object.

FIG. 7B schematically shows information comprised in a rights objects associated with the vCard of FIG. 7A. The rights object may be created by rights creating unit 202 as a new object or may be created from a template or an existing object after a user input. In a first section 710, the rights object comprises permissions. Rights management unit of a device receiving the vCard at the rights object assures that the vCard is only used as specified in the permissions. In line 711, the permission to contact the owner of the vCard is granted. In line 712, the permission to display the name of the owner of the vCard is granted. As a permission is only granted for displaying the name, other contact details comprised in the vCard, such as cell phone number, home phone number or VoIP-ID will not be displayed on the device receiving the vCard. Line 713 does not grant permission to forward the vCard. These are only a few examples of permissions, and other permissions may also be implemented in the rights object, such as a permission to print, a permission to copy, a permission to store and the like. If a permission is not set, the permission is generally not granted.

Section 715 of the rights object comprises constraints. The type of contact constraint 716 allows the owner of the vCard to be contacted by SMS only. The person receiving the vCard and the rights object may thus only send a short message to the cell phone of the vCard owner. If this constraint is provided, the owner of the vCard may select one or more possible types of contacts which the person receiving the vCard may use. Line 717 comprises a number of contacts constraint. In this example, it is set to two, meaning that the person receiving the vCard may contact the owner only twice. The number of forwarding constraint of line 718 is not applicable in this example, as forwarding is not permitted. Again, there may be fewer or more constraints comprised in the rights objects, such as a constraint on the time of contacting, a constraint on a person authorized to use the vCard, and other constraints.

The rights object may also be organized differently, it may for example comprise permissions and constraints associated with individual contact details of the vCard. Instead of having permissions for displaying particular contact details comprised in the vCard, there may be a general display permission provided, and a type of display constraint may be set in the constraint section. As can be seen, there are several possibilities of configuring the rights object. Two main features of the present embodiment are that the rights object enables the recipient of the vCard to contact the vCard owner, and that the rights object comprises permissions or constraints for only displaying the determined contact details comprised in the vCard.

Again referring to FIG. 2, the rights creation module 201 is configured so as to create a rights object as described above. The rights management unit 112 further comprises a repository management module 204 with a retrieving unit 205 and a en-/decryption unit 206. With the retrieving unit 205, contents in form of contact information and a rights object can be retrieved or accessed. Retrieving unit 205 may for example access a rights object and associated vCard S stored in memory 102, or it may access a vCard for which a rights object is to be created. When receiving a vCard and associated rights object, both are generally encrypted. The en-/decryption unit 206 of the rights management unit decrypts the rights object and the vCard. The rights object is generally encrypted in such a way that only the target DRM agent, here the rights management unit 112, can decrypt it. The rights object may then for example comprise a content encryption key, using which the en-/decryption unit 206 can decrypt the vCard. Accordingly, only the target DRM agent can access the encryption key and thus the contact information.

Similarly, when a vCard and a created rights object is to be transmitted to a receiving device with a running target DRM agent, the en-/decryption unit 206 encrypts the vCard as well as the rights object, so that only the target DRM agent can access the contact details comprised in the vCard. This can also be referred to as packaging the contact information.

A usage management module 207 with a permission manager 208 and a tracking manager 209 is also provided in rights management unit 112. This module enforces the observation of permissions and constraints of a rights object received by the device. Permission manager 208 ensures that received contact information is only used in accordance with permissions comprised in an associated object. With the example of FIGS. 7A and 7B, the permission manager 208 would ensure that the vCard is not forwarded, that only the name of the vCard owner is displayed, and that only SMS messages are sent to the vCard owner. Tracking manager 209 monitors the usage of received content and, together with permission manager 208, ensures that constraints provided in a rights object associated with the received content are observed. Again with respect to the example of FIGS. 7A and 7B, the tracking manager may track the number of SMS messages sent to the owner of the vCard. When it is determined that two SMS messages were sent, the sending of further SMS messages will not be allowed. Accordingly, the usage management module 207 controls the access to the contact information, here the vCard, and enables the use of the contact information for contacting the owner of the vCard.

Figure 3A:
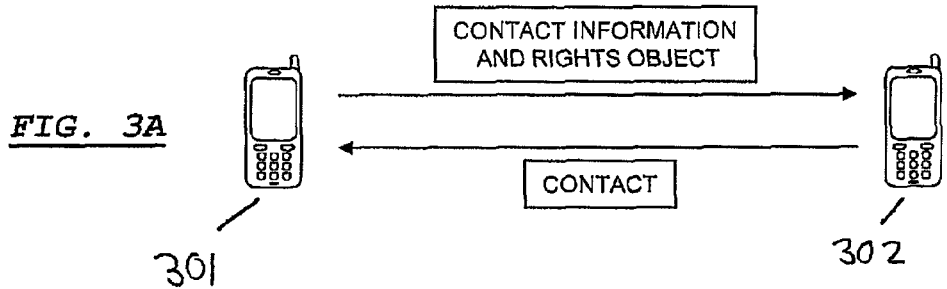
FIGS. 3A, 3B and 3C are schematic diagrams of options for exchanging contact information on the rights object according to an embodiment of the invention.
Figure 3B:
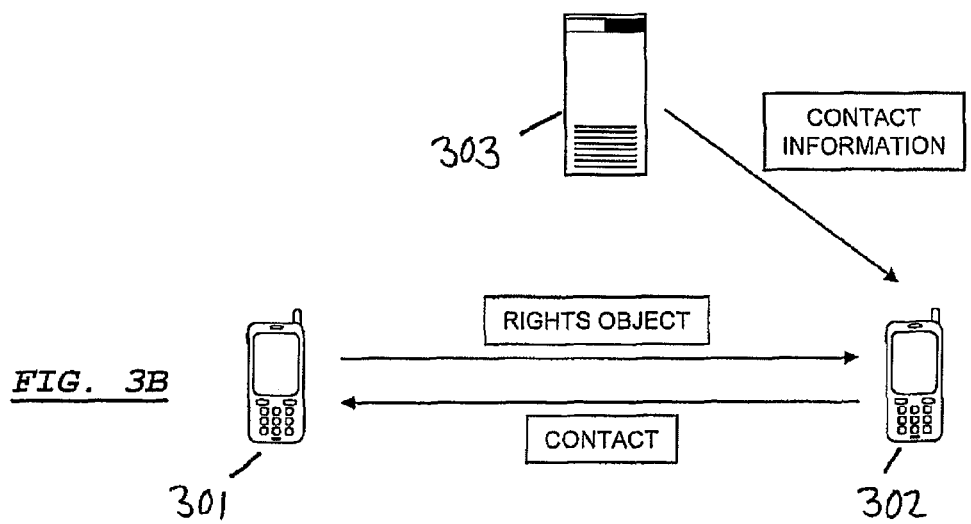
Figure 3C:
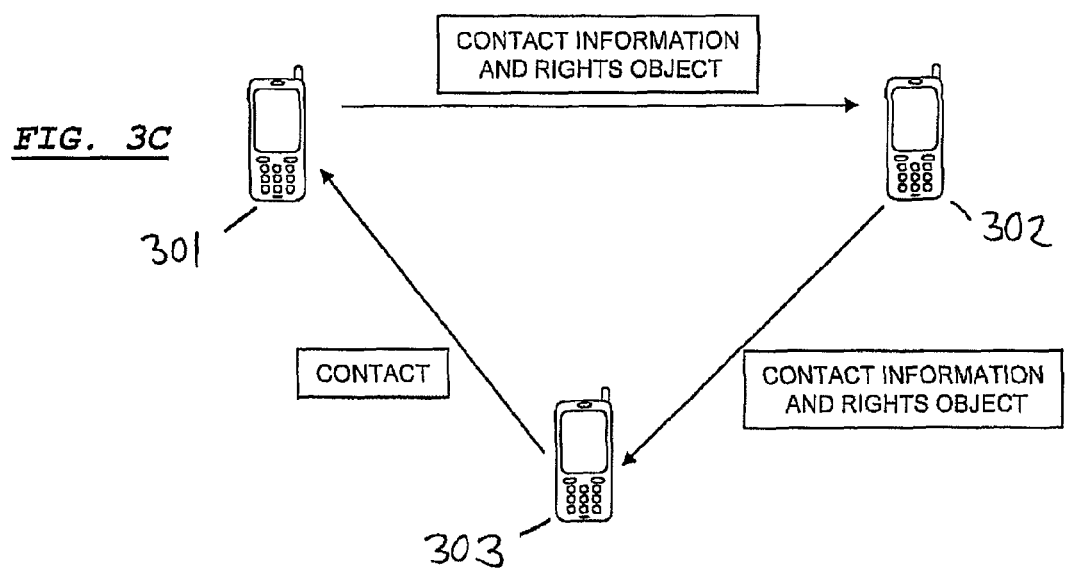

FIGS. 3A to 3C schematically show different possibilities of enabling access to contact information. In the example of FIG. 3A, the user of the device 301, which is a mobile phone, would like to enable the user of mobile phone 302 to contact him twice. Further, the user of mobile phone 302 is not supposed to get to know the phone number of mobile phone 301. Mobile phone 301, as a transmitting device, transmits contact information and an associated rights object to mobile phone 302. Using an appropriate transceiver of mobile phone 301 as a sending unit, the contact information in the rights object may be transmitted by using a Bluetooth protocol. The contact information comprises information for contacting mobile phone 301 as a recipient. It may also comprise information for contacting other recipients, such as a fixed line telephone, which are all in general associated with the owner of the contact information. The rights object comprises information that defines in detail in which way the recipient may be contacted. Mobile phone 302 receives the contact information and the rights object. A DRM agent running on mobile phone 302 interprets the rights object and correspondingly enables access to the contact information. A transceiver comprised in mobile phone 302 works as a receiving unit to receive the contact information and the rights object. In accordance with the permissions and constraints of the rights object, mobile phone 302 may then contact mobile phone 301. With a rights object similar to that of FIG. 7B, the contact may occur by mobile phone 302 sending a SMS to mobile phone 301. Besides the two messages sent, mobile phone 302 may not send any further messages. As the number of mobile phone 301 is not disclosed, the user of mobile phone 302 cannot share the number and cannot contact phone 301 by directly dialing the number. The person receiving the encrypted vCard can thus contact the person sending the vCard without ever knowing the phone number of said person.

Sharing contact information this way is particularly advantageous in situations where it is necessary to give out the contact information, yet it is not desirable that the person receiving the contact information is enabled to use it without restrictions. Several situations can be envisaged in which protecting the contact information in such a way is beneficial. One example is a physician who has given out his telephone number to a patient. He may wish the patient to contact him only once or twice, yet he may not want to be disturbed frequently. He may thus give out his contact information with a "number of contacts" restriction or a "time of contact" restriction.

FIG. 3B shows an example where the contact information is publicly available. The contact information may for example be provided on a server, and it may be accessed by an internet page and downloaded onto the mobile phone 302. Mobile phone 302 may receive the contact information via Bluetooth connection, a wireless local area connection, a half-wired connection or by means of a memory card or the like being inserted into mobile phone 302. The contact information is encrypted, and mobile phone 302 cannot make use of the contact details without an appropriate rights object. The user of mobile phone 301, who is the owner of the contact information, can transmit an appropriate rights object to mobile phone 302 to enable access to the contact information. By receiving the rights object, mobile phone 302 is enabled to contact the recipient, that is to say mobile phone 301.

FIG. 3C schematically illustrates yet another example of enabling access to contact information. The contact information together with an associated rights object is transmitted from mobile phone 301 to mobile phone 302. A DRM agent running on mobile phone 302 again interprets the rights object, which comprises a permission to forward the contact information once. The contact information and a rights object is then forwarded from mobile phone 302 to mobile phone 303. In mobile phone 303, a DRM agent enables a transmitting unit to contact the recipient designated in the contact information via mobile phone 301. From the point of mobile phone 303, the device transmitting the rights object and the recipient for which contact details are comprised in the contact information are different. It should be clear that the contacting again occurs in accordance with permissions and constraints comprised in the rights object. A tracking manager of the DRM agent will ensure that the contact information and the rights object are forwarded more often than permitted.

It should be clear that there is a large number of possibilities how the method of the invention can be implemented. A DRM agent may for example run on a home computer from which an e-mail is sent through the internet to another home computer also running a DRM agent. A rights object associated with the e-mail may then enable the receiving computer to reply to the e-mail only a predetermined number of times. Such an e-mail client can also run on a portable computer, or on a personal data assistant or any other handheld or stationary communication device.

Figure 4:
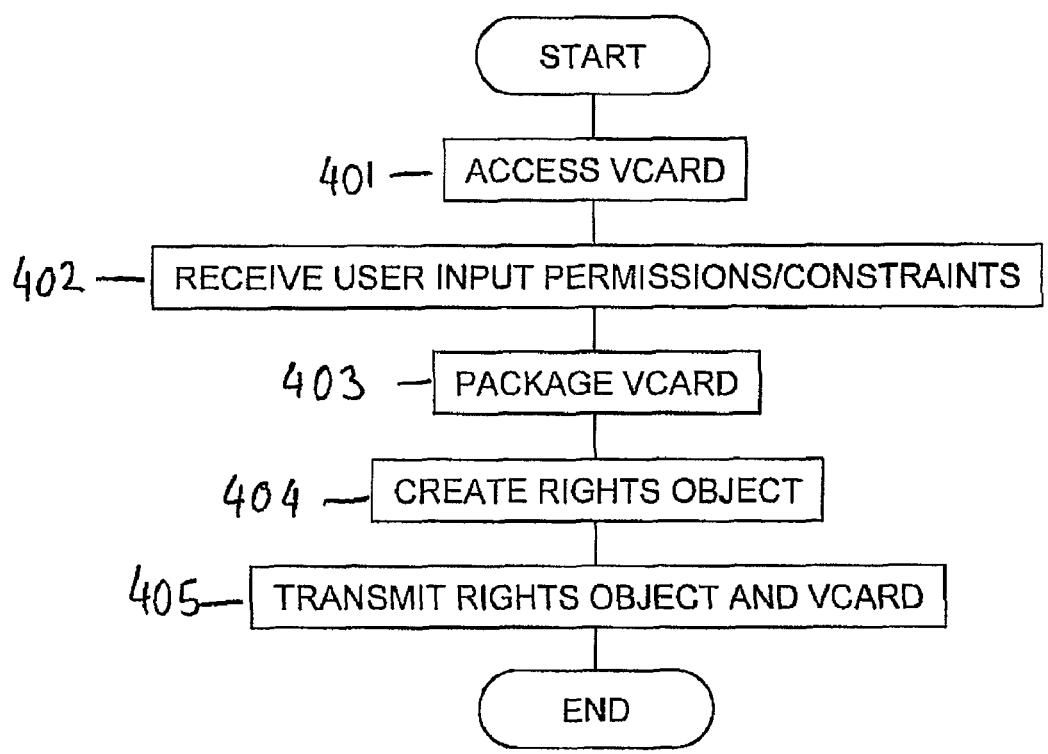
FIG. 4 is a flow chart illustrating the transmission of a rights object according to an embodiment of the invention.

FIG. 4 shows a flow diagram of a method according to an embodiment of the invention. The method is performed on a device the user of which wants to share the contact information with the device of another person, so that the person is then able to contact the user. In a first step 401, a vCard is accessed. The vCard is stored in a memory of the device and comprises the contact details of the user. The contact information does not need to be provided in the form of a vCard; any format may be used, such as other electronic business cards formats. Permissions and constraints for using the contact details comprised in the vCard input by a user are received in step 402. This step is optional, as predefined permissions and/or constraints can also be used. The vCard is packaged in step 403. Packaging comprises the encryption of the vCard using an encryption key (CEK, content encryption key). The packaged vCard may now only be accessed with the valid encryption key. In step 404, a rights object is created. It may be created as a new object, yet it may also be created from a template or an existing object associated with the vCard. The rights object comprises predefined permissions and constraints as well as user input permissions and constraints for using the vCard. The rights object may also comprise a constraint that requires a certain user identity to be present when the vCard is used. The rights object further comprises the content encryption key. The rights object is furthermore protected in such a way that it is only accessible by the target DRM agent, i.e. the DRM agent running on the receiving device. It may for example be protected by using a rights encryption key (REK). The rights object may furthermore comprise a digital signature. In the next step 405, the rights object and the vCard are transmitted to the receiving device. It may be transmitted separately, or both be packaged into one file and be transmitted as a single file. Both the rights object and the vCard are protected, as the rights object is bound to the DRM agent of the receiving device. As such, the rights object and the vCard may also be transmitted through channels which are publicly accessible.

It should be clear that this is only one example of a possible implementation. In another example, a user input may not be received, and the rights object may not be encrypted by using a second encryption key.

Figure 5:
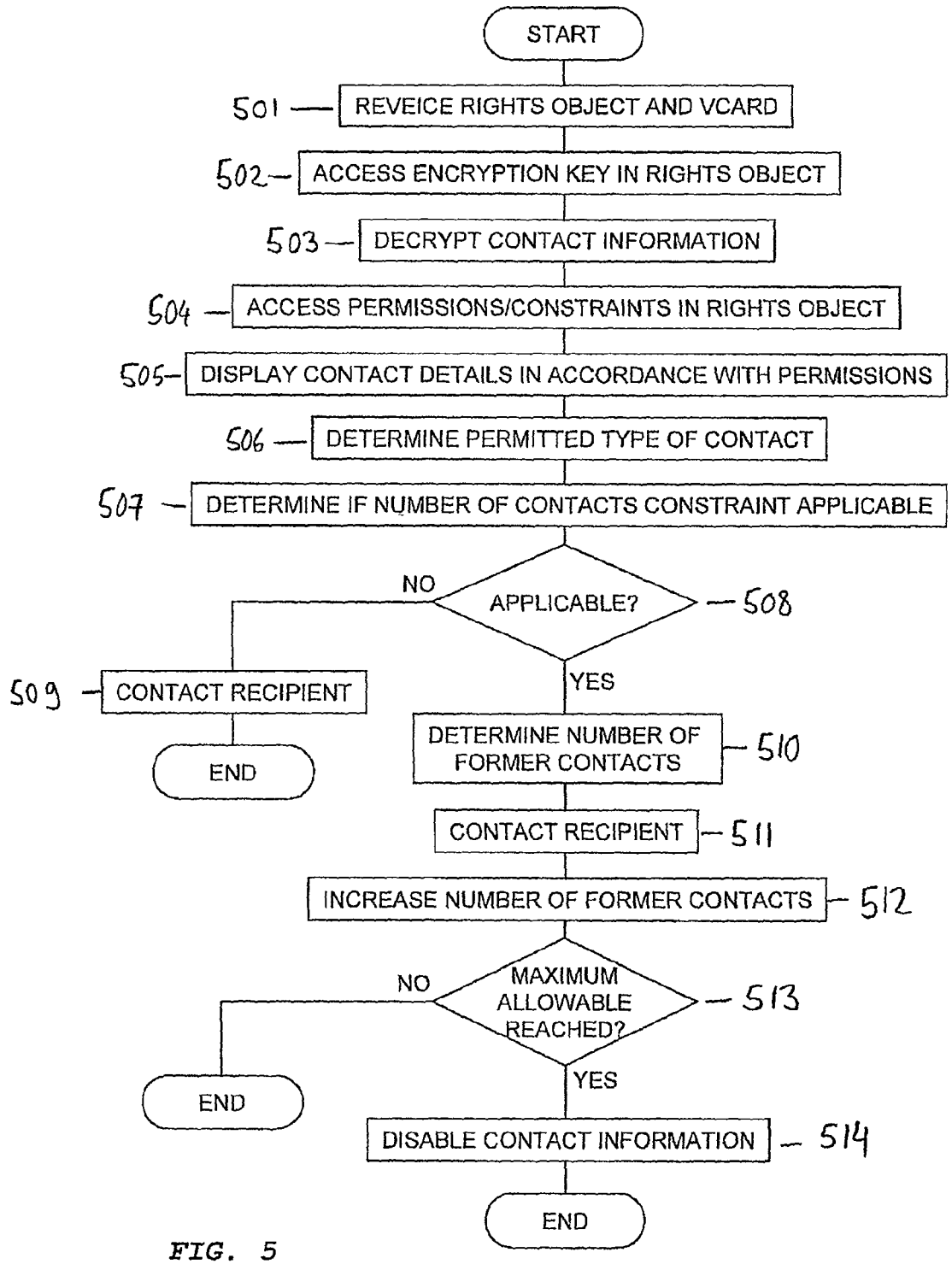
FIG. 5 is an illustrative flow chart of a method of enabling access to contact information according to an embodiment of the invention.

FIG. 5 shows a flow diagram of an embodiment of another aspect of the invention. This method may be implemented on the above-mentioned receiving device, which receives the rights object and the vCard in step 501. The DRM agent on the receiving device is capable of decrypting the rights object. In step 502, the DRM agent accesses the content encryption key in the rise object. In step 503, the contact information is decrypted by using the CEK. Steps 502 and 503 may for example be performed in the repository management module 204 of FIG. 2. Permissions and constraints comprise in a rights object an access in step 504. These are for example evaluated or interpreted by the usage management module 207 of FIG. 2. The DRM agent enforces the observation of these permissions and constraints. Contact details comprise in a received contact information a display in step 505 in accordance with the permissions. If the rights object only comprises a permission to display the name, only the name of the contact information owner is displayed. The type of permitted contact is determined in step 506. In step 507, it is determined whether a "number of contacts" constraint is applicable. If it is found not to be applicable in step 508, the contacting of the recipient may be initiated in step 509. The contacting is generally initiated by a user of the receiving device. The recipient may be a cellular phone, or a fixed-line phone, or any other device the contact details of which are comprised in the vCard. The permitted type of contact constraints is observed for contacting the recipient.

If the "number of contacts" constraint is found to be applicable in step 508, the number of former contacts is determined. The number of former contacts can be tracked by using the tracking manager 209 of FIG. 2. After determining the number in step 510, the recipient is contacted in step 511. In many cases, the recipient will be the device from which the rights object was received, but this does not always need to be the case. The rights object in a vCard may for example be transmitted from a mobile phone with a permission and contact details for contacting a home phone a predetermined number of times. After contacting the recipient, the number of former contacts is increased in step 512. In step 513, it is checked whether the maximum allowable number of contacts has been reached. If not, the rights object and the vCard can be stored on the device for contacting the recipient another time in the future. If the maximum has been reached, the contact information is disabled in step 514. That may result in the contact information and the rights object being deleted, or the contact information simply being deactivated. In any case, the user of the receiving device is no longer capable of contacting the recipient designated in the contact information. The owner of the vCard is thus spared from being contacted more often than desired by the user of the receiving device.

Figure 6A:
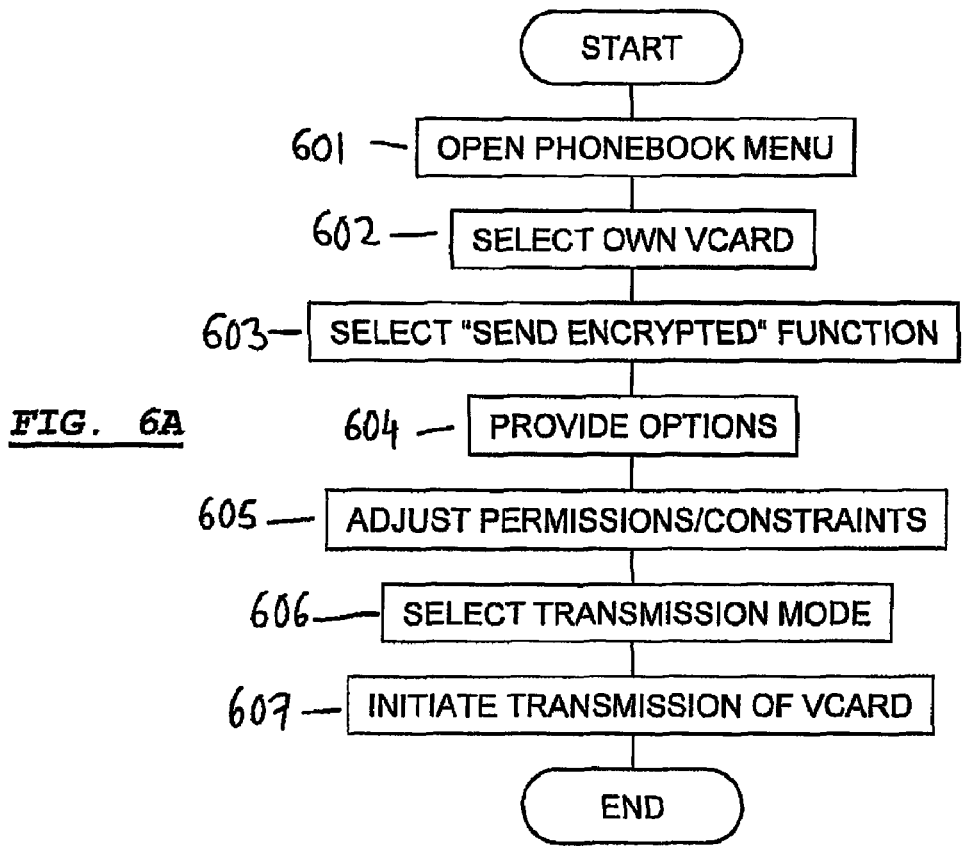
FIG. 6A and FIG. 6B are flow diagrams of an embodiment of the invention, illustrating a use of a device transmitting contact information and of a use of another device receiving said contact information and using said contact information in accordance with a transmitted rights object, respectively.
Figure 6B:
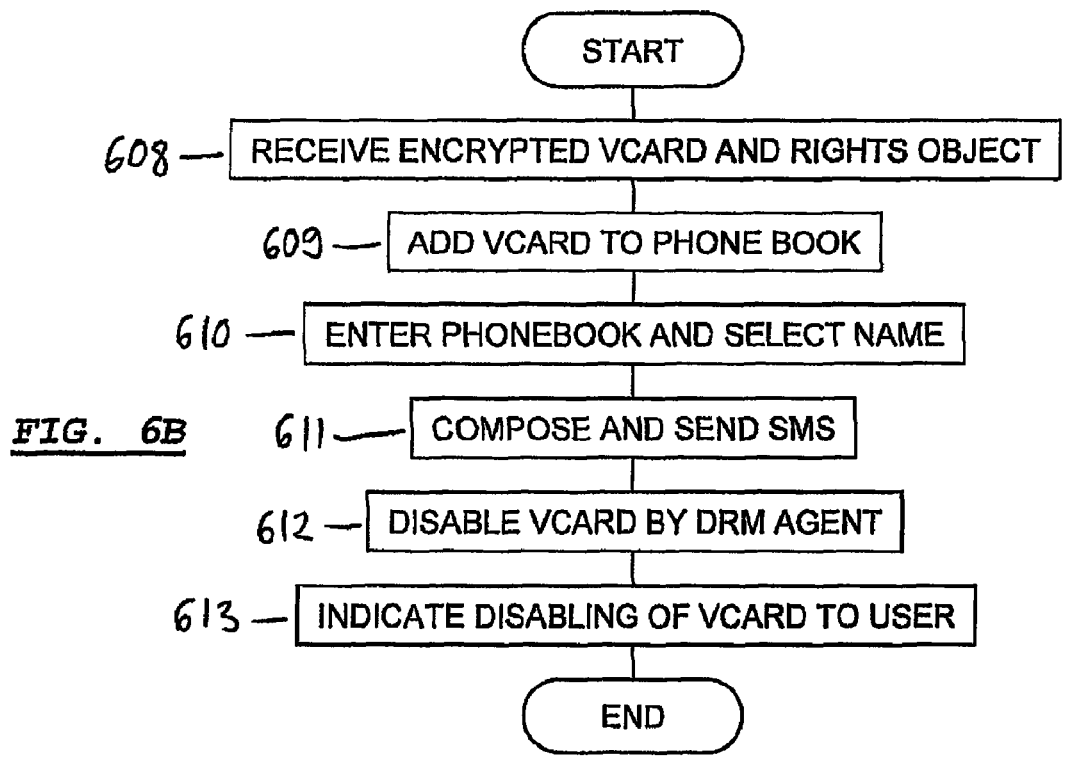

FIGS. 6A and 6B show flow diagrams of embodiments of the invention implemented on a device transmitting a rights object and on a device receiving a rights object, respectively, from a user perspective. The methods may for example be hidden under a graphical abstraction layer as a part of the phone book or of another functionality of the transmitting or receiving device. This way, the user is enabled to comfortably make use of the method. Referring to FIG. 6A, the user opens the phone book menu in step 601. This may be the phone book menu of a cellular phone or of a modern fixed-line phone, for example. In step 602, the user selects his own vCard. The user may have to enter his contact details once so that the vCard comprises these contact details. By using a function button, the user brings up a function menu, from which he selects a "send encrypted" function in step 603. An option screen may then be provided to the user on which he can set permissions and constraints for using the vCard. These options may already be preset, and only few options may be provided to the user to facilitate the option selection. The user may for example select the display permissions, the type of contact and the number of contacts constrained. The permissions and constraints are adjusted in step 605. After confirming the adjustments, the user is enabled to select a transmission mode in step 606. He may for example select to transmit the vCard via MMS or Bluetooth or any other suitable transmission mode. The user then initiates the transmission of the vCard in step 607.

Hidden under the graphical abstraction layer, the DRM agent encrypts the vCard and creates the appropriate rights object. The rights object and the vCard are then transmitted to a receiving device. Only steps relating to the transmission of the vCard are shown in this example, and the method may of course comprise further steps, such as a step of selecting the receiving device, a step of composing a message to the receiving device and the like. The vCard and the functions and options menus may be displayed on display 108 of FIG. 1, and the user may enter permissions and constraints and select functions and the transmission mode by using keypad 106 and control elements 107 of FIG. 1.

Referring now to FIG. 6B, the receiving device receives the encrypted vCard and the corresponding rights object in step 608. A message indicating the receipt may be provided to the user of the receiving device. The user selects to add the vCard to the phone book in step 609. In step 610, the user enters the phone book and selects the name of the owner of the received vCard. Step 610 does not need to be directly performed after step 609, but a longer time span may exist between these two steps. The user of the receiving device may for example wish to contact the owner of the vCard several days after receiving the vCard. After selecting the name, the user composes and sends an SMS. During this process, the cellular phone number comprised in the vCard is not disclosed to the user of the receiving device, yet he is still enabled to send the SMS. In the present example, the rights object comprises a constraint so that only one SMS can be sent to the recipient, i.e. the cellular phone of the vCard owner. Accordingly, the DRM agent running on the receiving device disables the vCard in step 612. The disabling of the vCard is indicated to the user in step 613. This may be achieved by graphical means, e.g. by displaying the name of the vCard owner in a different fond, color or brightness, or by adding some other graphical element to indicate the disabling. Alternatively, the vCard may simply be deleted from the phone book.

Using the above-described methods, both the user of the transmitting device and the user of the receiving device are in a simple and intuitive way enabled to exchange protected contact information. It should be understood that, in general, the transmitting device will also be capable of receiving encrypted contact information and an associated rights object, and to make use of the contact information in accordance with the permissions and constraints comprised in the rights object. Similarly, the receiving device will generally also be capable of transmitting vCards and associated rights objects. Yet this does not need to be the case, as some devices may for example not be capable of creating a rights object. These devices may then only receive rights objects, or may use free configured rights objects. Constraints and permissions in the rights object may be encoded using a digital rights language, such as the open digital rights language (ODRL), and the rights object may be an extensible mark-up language (XML) document. Yet it is not restricted to such an implementation, any implementation known to the skilled person may be used for creating the rights document.

While specific embodiments of the invention are disclosed herein, various changes and modifications can be made without departing from the spirit and the scope of the invention. The present embodiments are to be considered in all respect as illustrative and non-restrictive, and all changes coming within the meaning and equivalency range of the appended claims are intended to be embraced therein.

What is claimed is:

1. A method of controlling contact information, the method comprising:
    providing, at a transmitting device, a rights object associated with the contact information for a recipient; and
    transmitting, by the transmitting device, the rights object to a receiving device,
    wherein the rights object is configured to grant access to the contact information to the receiving device to enable contact of the recipient, the rights object being encrypted with a first key to be accessible only to a rights management unit of the receiving device, the rights object comprising:

information associated with at least one permission or at least one restriction, associated with use of the contact information, and a second key that allows the contact information to be decrypted, said second key being different from said first key.

2. The method of claim 1, wherein the rights object further comprises:
information about which portion of the contact information is to be disclosed to a user of the receiving device.

3. The method of claim 1, further comprising:
transmitting the contact information to the receiving device.

4. The method of claim 1, further comprising:
selecting a permission and/or a constraint for using the contact information.

5. The method of claim 4, further comprising:
generating the rights object based on the selected permission and/or constraint.

6. The method of claim 1, further comprising:
encrypting the contact information, wherein the contact information is encrypted using a content encryption key, and
where the content encryption key comprises the second key that allows the contact information to be decrypted.

7. The method of claim 1, wherein the at least one permission for using the contact information includes at least one of a permission to contact, a permission to display, a permission to forward, a permission to copy, or a permission to print.

8. The method of claim 1, wherein the at least one restraint for using the contact information including at least one of a permitted number of contacting, a person authorized to use, a number of permitted forwarding of the contact information, a permitted type of contact, or a permitted time of contact.

9. The method of claim 1, wherein the contact information comprises different types of contact details, and the rights object comprises usage permissions and/or constraints individually assigned to the contact details.

10. The method of claim 1, wherein the contact information comprises at least one contact detail including a name, a telephone number, a cellular phone number, an email address, an internet protocol (IP) address, a voice over IP user identification, an internet-based user identification, company information, or address information.

11. The method of claim 1, wherein the contact information comprises a vCard.

12. The method of claim 1, further comprising:
receiving the rights object at the receiving device; and
at the receiving device, enabling the use of the contact information based on information contained in the rights object.

13. A method of controlling contact information, the method comprising:
receiving, by a receiving device, a rights object associated with the contact information for contacting a recipient, the rights object encrypted with a first key to be accessible only to a rights management unit of the receiving device;
accessing, by a rights management unit of the receiving device, the rights object to retrieve a second key from the rights object, said second key being different from said first key;
accessing, by the receiving device, the contact information; and
enabling, by the receiving device, use of the contact information to contact the recipient based on information contained in the rights object, the receiving device using the second key to decrypt the contact information to enable use of the contact information, where the receiving device enables the use of the contact information in accordance with information on at least one permission or at least one restriction, included in the rights object.

14. The method of claim 13, further comprising:
retrieving the contact information.

15. The method of claim 13, wherein the at least one permission or the at least one restriction is associated with displaying a contact detail contained in the contact information.

16. The method of claim 15 further comprising:
displaying the contact information based on the at least one permission or the at least one restriction.

17. The method of claim 13, further comprising:
contacting the recipient using the contact information.

18. The method of claim 13, further comprising:
disabling use of the contact information to contact the recipient when a constraint defined in the rights object is exceeded.

19. The method of claim 13, further comprising:
providing the rights object in a transmitting device; and
at the transmitting device, transmitting the rights object so that the rights object can be received at the receiving device.

20. A device to control access to contact information, the device comprising:
a storage unit to store a rights object associated with the contact information for a recipient; and
a transmitting unit to transmit the rights object to a receiving device, the rights object including information to enable the receiving device to access the contact information to contact the recipient, where the rights object is encrypted with a first key to allow access to the rights object by only a rights management unit of the receiving device, and
where the information included in the rights object comprises:
information associated with at least one permission or at least one restriction, associated with use of the contact information, and
a second key that allows the contact information to be decrypted, said second key being different from said first key.

21. The device of claim 20, further comprising:
another rights management unit to manage the rights object, the other rights management unit to be implemented as a digital rights management agent when executed on the device.

22. The device of claim 20, further comprising:
another rights management unit including a unit to create and/or modify the rights object.

23. The device of claim 20, further comprising:
an input unit to enter a permission and/or a constraint to be included in the rights object.

24. The device of claim 20, wherein the rights object comprises at least one restriction for displaying, at the receiving device, a contact detail contained in the contact information.

25. The device of claim 20, wherein the transmitting unit is further configured to transmit the contact information to the receiving device.

26. The device of claim 20, further comprising:
a receiving unit to receive contact information for the recipient; and another rights management unit to enable the transmitting unit to contact the recipient and to restrict a disclosure of at least a potion of the received contact information to a user of the device.

27. The device of claim 20, wherein the device is a device including at least one of a cellular phone, a personal data assistant, a wireless handheld device, a portable computer, a network connected computer, an internet server, a telephone, or a set-top box.

28. A device to control access to contact information, the device comprising:
   a receiving unit to receive a rights object associated with contact information for a recipient, where the rights object is encrypted with a first key to allow access to the contact information by only a rights management unit and includes a second key for decrypting the rights object, said second key being different from said first key;
   a transmitting unit; and
   the rights management unit to:
      access the rights object to retrieve the second key from the rights object;
      enable the transmitting unit to contact the recipient based on the contact information contained in the rights object, the device using the second key to decrypt the contact information to enable use of the contact information, where the device enables the use of the contact information in accordance with information on at least one permission or at least one restriction included in the right object.

29. The device of claim 28, wherein the rights management unit is configured to restrict disclosure of the contact information to a user of the device based on the at least one permission or the at least one restriction contained in the rights object.

30. The device of claim 28, wherein the rights object comprises constraints for use of the contact information, and the rights management unit is configured to enforce the constraints.

31. The device of claim 28, wherein the rights management unit is configured to disable use of the contact information to contact the recipient when a constraint contained in the rights object is satisfied, the constraint defining to a maximum number of times the device is permitted to contact the recipient using the contact information.

32. The method of claim 28, wherein the receiving unit is further configured to receive the contact information.

33. The device of claim 28, wherein the transmitting unit is further configured to transmit the rights object associated with the contact information for the recipient to the receiving device, and the rights management unit is configured to manage the rights object, the at least one permission or the at least one restriction comprising information enabling the receiving device to access to the contact information to contact the recipient.

34. The device of claim 28, wherein the device is a device including a cellular phone, a personal data assistant, a wireless handheld device, a portable computer, a network connected computer, an internet server, a telephone, or a set-top box.

35. A non-transitory processor-readable storage device having processor-executable instructions stored thereon for controlling access to contact information when executed on a processor of a device, the non-transitory processor-readable storage device comprising:
   instructions to access a rights object associated with the contact information for a recipient, the rights object encrypted with a first key, the rights object including:
      at least one permission and/or restriction for disclosure of a contact detail contained in the contact information, and
      a second key that allows the contact information to be decrypted, said second key being different from said first key; and
   instructions to initiate transmission of the rights object to a receiving device, the rights object to grant access to the contact information to only a rights management unit, of the receiving device.

36. A non-transitory processor-readable storage device to store processor-executable instructions to control access to contact information, which when executed on a processor of a device, causes the device to perform:
   receiving a rights object associated with the contact information for a recipient, the rights object encrypted with a first key to be accessible only to a rights management unit of the device;
   accessing the rights object to retrieve a second key from the rights object, said second key being different from said first key;
   determining, based on the rights object, at least a portion of the contact information that is not to be disclosed to a user of the device; and
   enabling, by the device, use of the contact information to contact the recipient based on information contained in the rights object, the device using the second key to decrypt the contact information to enable use of the contact information, where the device enables the use of the contact information in accordance with information on at least one permission or at least one restriction, included in the rights object.

* * * * *